Jan. 2, 1934.   L. E. MYLTING   1,942,304
SHAFT AND PROCESS OF APPLYING NONCORROSIVE METALLIC SHEATHING THERETO

Filed Jan. 23, 1932

Inventor
LAURITZ EMIL MYLTING.
By Richey & Watts
Attorney

Patented Jan. 2, 1934

1,942,304

UNITED STATES PATENT OFFICE 1,942,304

SHAFT AND PROCESS OF APPLYING NON-CORROSIVE METALLIC SHEATHING THERETO

Lauritz Emil Mylting, Hamburg, Pa., assignor to The Allen-Sherman-Hoff Company, Philadelphia, Pa., a corporation of Pennsylvania Application January 23, 1932. Serial No. 588,345

6 Claims. (Cl. 29—148)

This invention relates to a shaft and a process of applying non-corrosive metallic sheathing thereto.

This invention is directed to the protecting of shafts and the like from corrosion by the application of a non-corrosive metallic sheathing to the shaft in the zones most likely to be affected by such corrosion or over its entire length.

For example, in the case of centrifugal pumps operating on liquids other than pure water, or liquids wherein there is present a certain amount of salts or other rust producing chemicals, the shaft will wear away under the corrosion thus induced and will ultimately be rendered useless for the purpose intended. It is my intention to produce a pipe that is protected in those parts that are subjected to such corrosive action by applying a sheathing of non-corrosive material, such as for example stainless steel, that is wound on the shaft and is securely affixed thereto by a process of welding to be hereinafter set forth more in detail.

One object of this invention is to preserve the life of shafts susceptible to corrosion that operate under conditions inducive of corrosion. Another object of this invention is to produce a shaft that is corrosion resisting by reason of a sheathing of non-corrosive material. Another object of this invention lies in the provision of a process of applying non-corrosive sheathing to a shaft or the like whereby a good secure bond between the aforementioned parts is obtained by welding.

Other objects and advantageous features of this invention will be noted in the following detailed description and accompanying drawing, wherein like characters of reference designate like parts and wherein.

Figure 1:
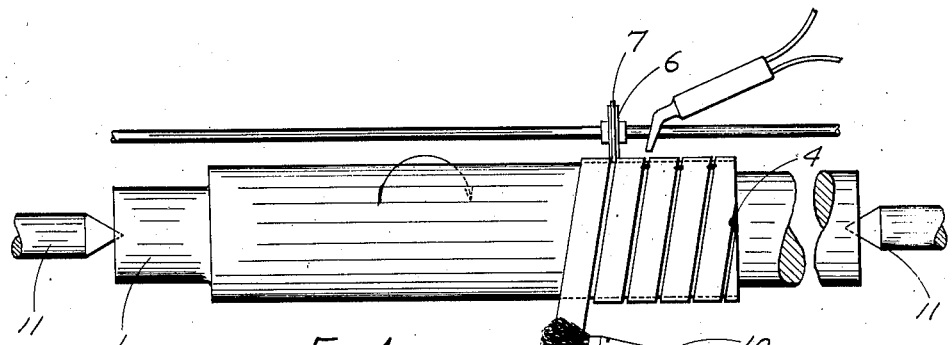
Figure 1 is an elevation of a shaft showing a length of non-corrosive material applied thereto and illustrating the initial step of the process, namely the "tacking step"

Heretofore much difficulty has been experienced in producing a shaft that would resist rust and corrosion over long periods of time and yet render highly efficient service for the intended purpose. In some instances, the shaft has been turned of stainless steel or other non-corrosive material, while in other instances the shaft has been either nickel or chromium plated, all of which is more or less expensive both as to the material employed and the process of constructing or applying, as the case may be.

Another method of protecting shafts is to bush them by shrinking on a tube or sleeve of non-corrodible material. However, this is likewise expensive inasmuch as the shaft and the bore of the tube or sleeve must be matched in order to obtain a proper fit within the desired limits of accuracy. In the instant invention, these difficulties are overcome by applying to the shaft to be protected a sheathing of relatively thick non-corrosive material, such as a ribbon of stainless steel, and securing the same thereto by a process of welding.

More in particular, with reference to the drawing, I have shown a shaft 1 to which I intend to apply a ribbon 2 of material such as stainless steel. The width of ribbon is optional and may vary for shafts of varying diameter.

The first step of the process is to "tack" the ribbon to the shaft, spacing each wind sufficiently to permit welding material to be deposited in the gap thus produced as a part of the second step, after which the shaft is machined and finished.

In carrying out the process, the shaft may be placed in a lathe or similar machine, not shown, except for the centers 11, that is adapted to slowly rotate the same during the process of affixing the sheathing thereto. Prior to rotating the shaft, however, one end of the ribbon of stainless steel is spot welded to the extreme end of the shaft as at 4, after which the shaft may be slowly rotated and the ribbon wound thereon. I intend to apply heat directly to the ribbon by means of a burner such as that indicated at 10, and to wind, for example, one turn thereon after which I "tack" the edge of the ribbon to the shaft to prevent the turn from unwinding. Hence, when the ribbon is completely wound on the shaft, it will be tacked at a plurality of spaced points as indicated at 5. The ribbon, during the winding process, is of course drawn taut against the motion of the lathe. By preheating the ribbon and tacking it to the shaft body in a plurality of points a series of sections will be formed each of which will be shrunk tightly about the shaft body upon cooling thus assisting in forming a firmly secured unitary structure.

It will be noted in Fig. 1 that I have shown a roller 6 as provided with a rim or edge 7 which engages the shaft 1 and lies between the turns of the ribbon. The roller may be fitted on a shaft about which it can rotate and along which it can travel and thereby follow the spiral winding, altho I have not shown any preferred means of supporting this roller, it will be readily understood that such means may be of almost any nature desired without departing from the scope of this invention.

When the ribbon is entirely wound on the shaft the free end thereof may be pressed into firm engagement with the shaft by means of an idle roller 9 preferably mounted on the lathe which holds this end of the ribbon in position for final "tacking".

So much for the first step, the second step has to do with affixing the ribbon of stainless steel permanently to the shaft. This may be accomplished by the use of an oxy-acetylene torch, as indicated at 12 or by an electric welding device or any other suitable means. Starting at the right of the shaft, the welding material, which is similar to that of the ribbon, is caused to fill the gap between the spiral turns of the ribbon, the shaft, of course, being slowly rotated, the material to be deposited being shown by the numeral 14. However, when the welding is completed, the surface of the sheathing is somewhat irregular owing to the welding material which not only fills the gaps but projects above the same, thus necessitating a third and final step, namely that of finishing the article.

Figure 2:
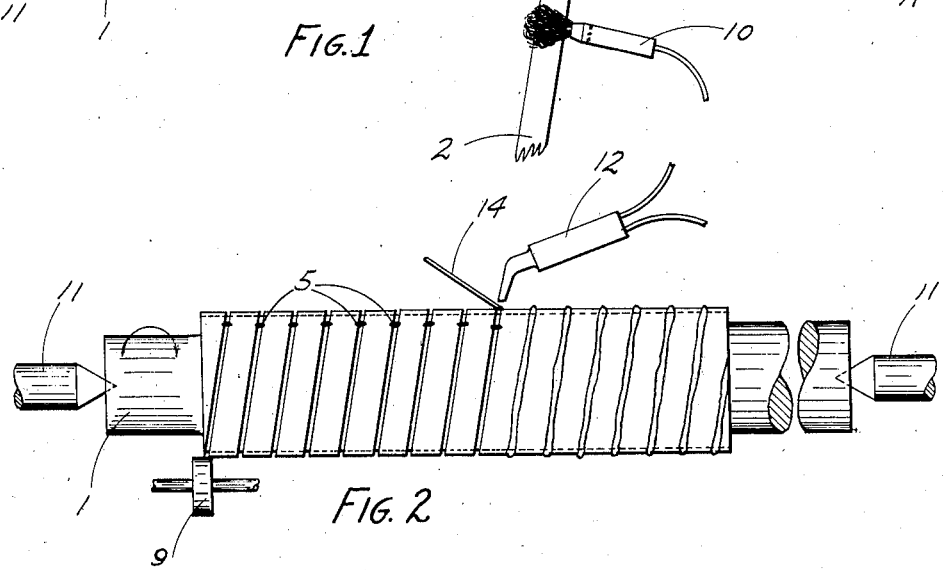
Fig. 2 is an elevation showing the length of non-corrosive material wound on the shaft and illustrating the second step of my process, namely the step of welding the non-corrosive material to the shaft.
Figure 3:
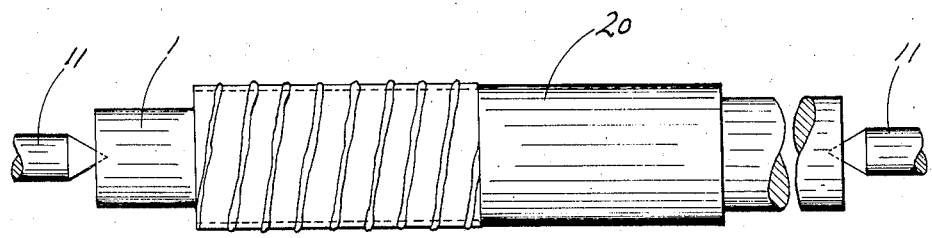
Fig. 3 is an elevation similar to Figs. 1 and 2, showing the completed shaft with the non-corrosive ribbon welded thereto and illustrating the third step of the process, namely the step of finishing the product.

The final step in the process is to machine the product of Fig. 2 in any manner desired to smooth off the periphery as shown in Fig. 3 at 20, as distinguished from the unfinished portion and turn down the shaft to the proper diameter for use, it being understood that the welding material presents an unfinished surface unsuited to the uses to which the shaft is put.

Although I have indicated that the ribbon of stainless steel may be square along the marginal edge, it is within the precepts of this invention to employ ribbon having a bevel edge that will produce a V-shaped groove when wound on the shaft. This would necessitate the use of a roller of different contour than that described hereinabove, although it can be readily foreseen that either type of ribbon may be employed with satisfactory results.

Essentially, this invention consists in the economical production of a shaft of metal that would ordinarily give way to corrosion and applying thereto a sheathing of non-corrosive material. The material, hereinbefore mentioned, is preferably of a non-corrosive type and the preferred material is "stainless steel" in ribbon form.

Although the invention has been described as applied to a shaft on a centrifugal pump, it is equally applicable to any type of shaft, drum, roller, or the like and although I have shown a preferred embodiment of this invention in the accompanying drawing, it will be appreciated that certain variations will occur to those skilled in the art within the scope and teachings of this invention and I do not care to be limited to the exact showing therein except as indicated in the accompanying claims.

Having thus described my invention, what I claim is:—

1. As an article of manufacture, a shaft having a protective covering, said protective covering consisting of a ribbon of stainless steel wound in spaced convolutions on said shaft, said spaces being filled with non-corrosive material.

2. As an article of manufacture, a shaft and a protective covering therefor comprising a non-corrosive metallic material wound thereon, each convolution being spaced apart and filled with non-corrosive welding material to affix said sheathing to said shaft.

3. A method of applying non-corrosive metallic sheathing to other metallic bodies, which consists in winding the sheathing on the metallic body, spacing each convolution apart and spot welding the edge of said sheathing to the metallic body and thereafter welding the sheathing over its entire length to the shaft.

4. A method of applying a ribbon of stainless steel to a metal shaft, which consists in winding the ribbon about the shaft, applying heat to said ribbon during the winding, spot welding the ribbon at spaced points to the shaft and thereafter welding the ribbon to the shaft by filling the gaps between the successive convolutions with non-corrosive welding material.

5. A method according to claim 4, characterized by the fact that the surface is thereafter machined and finished.

6. A method of applying a ribbon of stainless steel to a metal shaft which consists in spirally winding the ribbon longitudinally of the shaft, applying heat to the ribbon during the process of winding, tacking the edge of the ribbon to the shaft by spot welding, welding the ribbon to the shaft by depositing welding material in the spaces between the convolutions and thereafter finishing the surface by machining.

LAURITZ EMIL MYLTING.